Nov. 12, 1968 M. MARTINEK 3,411,094

SYSTEM FOR PROVIDING PULSES OF A SELECTED NUMBER EQUALLY SPACED FROM EACH OTHER

Filed Oct. 20, 1965 4 Sheets-Sheet 1

INVENTOR.

Miloslav Martinek

BY

Richard Lord

Agt

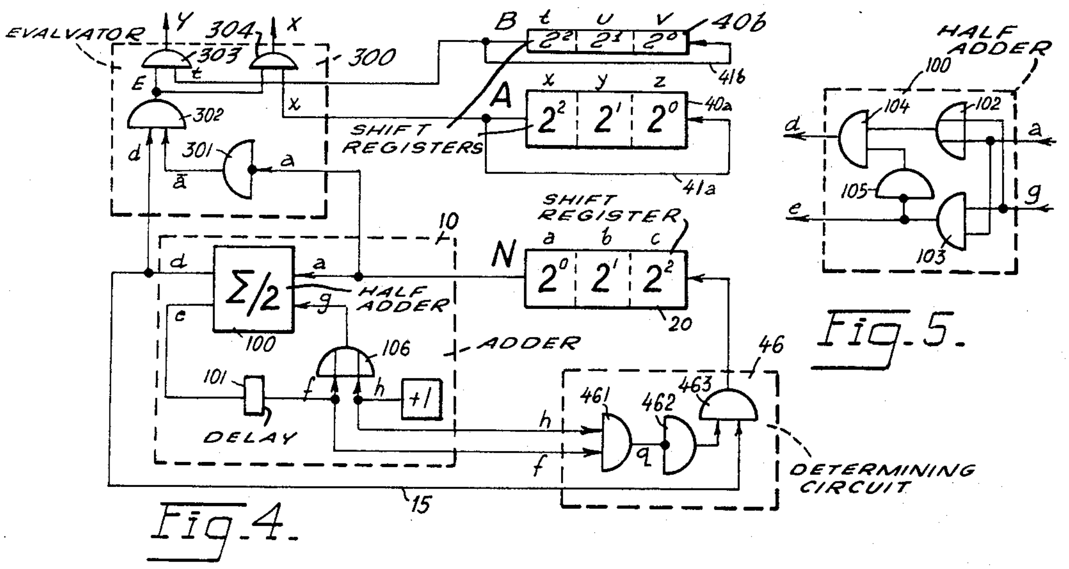
Fig. 4. Fig. 5.
| $t_n$ | N | | | | | | | | E | A = 2 | | | X | B = 6 | | | Y |
|---|---|---|---|---|---|---|---|---|---|---|---|---|---|---|---|---|---|
| | a | b | c | d | e | f | g | h | | x | y | z | | t | u | v | |
| $t_0$ | 0 | 0 | 0 | 1 | 0 | - | 1 | 1 | 1 | 0 | 1 | 0 | | 1 | 1 | 0 | 1 |
| $t_1$ | 0 | 0 | 1 | 0 | 0 | 0 | 0 | 0 | | 1 | 0 | 0 | | 1 | 0 | 1 | |
| $t_2$ | 0 | 1 | 0 | 0 | 0 | 0 | 0 | 0 | | 0 | 0 | 1 | | 0 | 1 | 1 | |
| $t_3$ | 1 | 0 | 0 | 0 | 1 | 0 | 1 | 1 | | 0 | 1 | 0 | | 1 | 1 | 0 | |
| $t_4$ | 0 | 0 | 0 | 1 | 0 | 1 | 1 | 0 | 1 | 1 | 0 | 0 | 1 | 1 | 0 | 1 | 1 |
| $t_5$ | 0 | 0 | 1 | 0 | 0 | 0 | 0 | 0 | | 0 | 0 | 1 | | 0 | 1 | 1 | |
| $t_6$ | 0 | 1 | 0 | 1 | 0 | 0 | 1 | 1 | 1 | 0 | 1 | 0 | | 1 | 1 | 0 | 1 |
| $t_7$ | 1 | 0 | 1 | 1 | 0 | 0 | 0 | 0 | | 1 | 0 | 0 | | 1 | 0 | 1 | |
| $t_8$ | 0 | 1 | 1 | 0 | 0 | 0 | 0 | 0 | | 0 | 0 | 1 | | 0 | 1 | 1 | |
| $t_9$ | 1 | 1 | 0 | 0 | 1 | 0 | 1 | 1 | | 0 | 1 | 0 | | 1 | 1 | 0 | |
| $t_{10}$ | 1 | 0 | 0 | 0 | 1 | 1 | 1 | 0 | | 1 | 0 | 0 | | 1 | 0 | 1 | |
| $t_{11}$ | 0 | 0 | 0 | 1 | 0 | 1 | 1 | 0 | 1 | 0 | 0 | 1 | | 0 | 1 | 1 | |
| $t_{12}$ | 0 | 0 | 1 | 1 | 0 | 0 | 1 | 1 | 1 | 0 | 1 | 0 | | 1 | 1 | 0 | 1 |
| $t_{13}$ | 0 | 1 | 1 | 0 | 0 | 0 | 0 | 0 | | 1 | 0 | 0 | | 1 | 0 | 1 | |
| $t_{14}$ | 1 | 1 | 0 | 1 | 0 | 0 | 0 | 0 | | 0 | 0 | 1 | | 0 | 1 | 1 | |
| $t_{15}$ | 1 | 0 | 1 | 0 | 1 | 0 | 1 | 1 | | 0 | 1 | 0 | | 1 | 1 | 0 | |
| $t_{16}$ | 0 | 1 | 0 | 1 | 0 | 1 | 1 | 0 | 1 | 1 | 0 | 0 | 1 | 1 | 0 | 1 | 1 |
| $t_{17}$ | 1 | 0 | 1 | 1 | 0 | 0 | 0 | 0 | | 0 | 0 | 1 | | 0 | 1 | 1 | |
| $t_{18}$ | 0 | 1 | 1 | 1 | 0 | 0 | 1 | 1 | 1 | 0 | 1 | 0 | | 1 | 1 | 0 | 1 |
| $t_{19}$ | 1 | 1 | 1 | 1 | 0 | 0 | 0 | 0 | | 1 | 0 | 0 | | 1 | 0 | 1 | |
| $t_{20}$ | 1 | 1 | 1 | 1 | 0 | 0 | 0 | 0 | | 0 | 0 | 1 | | 0 | 1 | 1 | |
| $t_{21}$ | 1 | 1 | 1 | 0 | 1 | 0 | 1 | 1 | | 0 | 1 | 0 | | 1 | 1 | 0 | |
| $t_{22}$ | 1 | 1 | 0 | 0 | 1 | 1 | 1 | 0 | | 1 | 0 | 0 | | 1 | 0 | 1 | |
| $t_{23}$ | 1 | 0 | 0 | 0 | 1 | 1 | 1 | 0 | | 0 | 0 | 1 | | 0 | 1 | 1 | |
| END | 0 | 0 | 0 | 1 | 0 | 1 | 1 | 1 | q = 1 | | | STOP | | | | | |
Fig. 6.
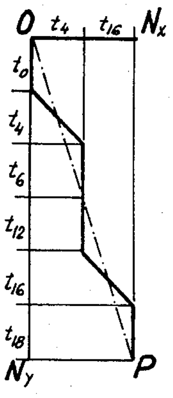
Fig. 7.
INVENTOR.
Miloslav Martinek
BY
[signature]
Att'y Nov. 12, 1968 M. MARTINEK 3,411,094

SYSTEM FOR PROVIDING PULSES OF A SELECTED NUMBER EQUALLY SPACED FROM EACH OTHER

Filed Oct. 20, 1965 4 Sheets-Sheet 3

| $t_n$ | $T_m$ | x | t | a | y | u | b | z | v | c | d | e | f | g | h | i | x̄ | E | j | k | X | Y |
|---|---|---|---|---|---|---|---|---|---|---|---|---|---|---|---|---|---|---|---|---|---|---|
| $t_0$ | $T_0$ | 0 | 1 | 0 | 1 | 1 | 0 | 0 | 0 | 0 | 0 | 0 | 0 | 0 | 0 | | | | | | | |
| | $T_1$ | 1 | 0 | 1 | 1 | 0 | 0 | 0 | 0 | 0 | 1 | 0 | 0 | 0 | 0 | | | | | | | |
| | $T_2$ | 0 | 1 | 1 | 0 | 0 | 0 | 0 | 0 | 1 | 1 | 0 | 0 | 1 | 1 | 1 | 1 | [1] | 0 | 1 | 0 | (1) |
| $t_1$ | $T_3$ | 1 | 1 | 0 | 0 | 0 | 0 | 0 | 1 | 1 | 1 | 0 | 0 | 0 | 0 | | | | | | | |
| | $T_4$ | 1 | 0 | 0 | 0 | 0 | 0 | 1 | 1 | 1 | 1 | 0 | 0 | 0 | 0 | | | | | | | |
| | $T_5$ | 0 | 0 | 0 | 0 | 0 | 1 | 1 | 1 | 1 | 0 | 0 | 0 | 0 | 0 | 1 | 1 | 0 | 1 | 1 | 0 | 0 |
| $t_2$ | $T_6$ | 0 | 0 | 0 | 0 | 1 | 1 | 1 | 1 | 0 | 0 | 0 | 0 | 0 | 0 | | | | | | | |
| | $T_7$ | 0 | 0 | 0 | 1 | 1 | 1 | 1 | 0 | 0 | 0 | 0 | 0 | 0 | 0 | | | | | | | |
| | $T_8$ | 0 | 0 | 1 | 1 | 1 | 1 | 0 | 0 | 0 | 0 | 0 | 0 | 0 | 0 | 1 | 1 | 0 | 0 | 0 | 0 | 0 |
| $t_3$ | $T_9$ | 0 | 1 | 1 | 1 | 1 | 0 | 0 | 0 | 0 | 0 | 0 | 0 | 0 | 0 | | | | | | | |
| | $T_{10}$ | 1 | 1 | 1 | 1 | 0 | 0 | 0 | 0 | 0 | 1 | 0 | 0 | 0 | 0 | | | | | | | |
| | $T_{11}$ | 1 | 1 | 1 | 0 | 0 | 0 | 0 | 0 | 1 | 0 | 1 | 0 | 1 | 1 | 1 | 0 | 0 | 0 | 1 | 0 | 0 |
| $t_4$ | $T_{12}$ | 1 | 1 | 0 | 0 | 0 | 0 | 0 | 1 | 0 | 1 | 0 | 0 | 0 | 0 | | | | | | | |
| | $T_{13}$ | 1 | 0 | 0 | 0 | 0 | 0 | 1 | 0 | 1 | 1 | 0 | 0 | 0 | 0 | | | | | | | |
| | $T_{14}$ | 0 | 0 | 0 | 0 | 0 | 1 | 0 | 1 | 1 | 1 | 0 | 1 | 1 | 0 | 1 | 1 | [1] | 1 | 1 | (1) | (1) |
| $t_5$ | $T_{15}$ | 0 | 0 | 0 | 0 | 1 | 0 | 1 | 1 | 1 | 0 | 0 | 0 | 0 | 0 | | | | | | | |
| | $T_{16}$ | 0 | 0 | 0 | 1 | 0 | 1 | 1 | 1 | 0 | 0 | 0 | 0 | 0 | 0 | | | | | | | |
| | $T_{17}$ | 0 | 0 | 1 | 0 | 1 | 1 | 1 | 0 | 0 | 0 | 0 | 0 | 0 | 0 | 1 | 1 | 0 | 0 | 0 | 0 | 0 |
| $t_6$ | $T_{18}$ | 0 | 1 | 0 | 1 | 1 | 1 | 0 | 0 | 0 | 0 | 0 | 0 | 0 | 0 | | | | | | | |
| | $T_{19}$ | 1 | 0 | 1 | 1 | 1 | 0 | 0 | 0 | 0 | 1 | 0 | 0 | 0 | 0 | | | | | | | |
| | $T_{20}$ | 0 | 1 | 1 | 1 | 0 | 0 | 0 | 0 | 1 | 1 | 0 | 0 | 1 | 1 | 1 | 1 | [1] | 0 | 1 | 0 | (1) |
| $t_7$ | $T_{21}$ | 1 | 1 | 1 | 0 | 0 | 0 | 0 | 1 | 1 | 1 | 0 | 0 | 0 | 0 | | | | | | | |
| | $T_{22}$ | 1 | 1 | 0 | 0 | 0 | 0 | 1 | 1 | 1 | 1 | 0 | 0 | 0 | 0 | | | | | | | |
| | $T_{23}$ | 1 | 0 | 0 | 0 | 0 | 1 | 1 | 1 | 1 | 1 | 0 | 0 | 0 | 0 | 1 | 0 | 0 | 1 | 1 | 0 | 0 |
| $t_8$ | $T_{24}$ | 0 | 0 | 0 | 0 | 1 | 1 | 1 | 1 | 1 | 0 | 0 | 0 | 0 | 0 | | | | | | | |
| | $T_{25}$ | 0 | 0 | 0 | 1 | 1 | 1 | 1 | 1 | 0 | 0 | 0 | 0 | 0 | 0 | | | | | | | |
| | $T_{26}$ | 0 | 0 | 1 | 1 | 1 | 1 | 1 | 0 | 0 | 0 | 0 | 0 | 0 | 0 | 1 | 1 | 0 | 0 | 0 | 0 | 0 |
| $t_9$ | $T_{27}$ | 0 | 1 | 1 | 1 | 1 | 1 | 0 | 0 | 0 | 0 | 0 | 0 | 0 | 0 | | | | | | | |
| | $T_{28}$ | 1 | 1 | 1 | 1 | 1 | 0 | 0 | 0 | 0 | 1 | 0 | 0 | 0 | 0 | | | | | | | |
| | $T_{29}$ | 1 | 1 | 1 | 1 | 0 | 0 | 0 | 0 | 1 | 0 | 1 | 0 | 1 | 1 | 1 | 0 | 0 | 0 | 1 | 0 | 0 |

INVENTOR.
Miloslav Martínek
BY
Richard Lord
Ag't

INVENTOR.
Miloslav Martinek
BY
Richard Low
Ag't

United States Patent Office 3,411,094
Patented Nov. 12, 1968

3,411,094
SYSTEM FOR PROVIDING PULSES OF A SELECTED NUMBER EQUALLY SPACED FROM EACH OTHER

Miloslav Martínek, Prague, Czechoslovakia, assignor to Vyzkumny ustav matematickych stroju, Prague, Czechoslovakia Filed Oct. 20, 1965, Ser. No. 498,857
19 Claims. (Cl. 328—37)

ABSTRACT OF THE DISCLOSURE

An accumulator comprises a shift register for storing a plurality of pulses in a pattern of a determined code, a feedback line from the output to the input of the register and an adder connected in the feedback line for changing the pattern of the number of pulses circulating in the line to a new one which differs from the first. A plurality of additional shift registers with feedback lines are supplied numbers representing the selected number of pulses. An evaluator provides selected numbers of pulses at equal spacing from each other at a plurality of outputs each corresponding to one of the additional shift registers from inputs of pulses representing those supplied to the adder, pulses representing those supplied by the adder to the shift register and the outputs of the additional shift registers.

This invention relates to a system for generating selected numbers of pulses.

With digital-analog computers, particularly special-purpose computers intended for digital machine tool control, the problem frequently arises that selected numbers of pulses are to be produced with even spacing.

In most cases, arithmetic units are used which consist of a counter and gates. The individual sections of the counter or the outputs of the decoders and the respective outputs connected to them pass through the gates and are logically added. The simultaneously produced pulses correspond in number to the gates. The number of the individual pulse trains is determined by the gates, the size of the counter, and the number of its variations. The uniformity of mutual distribution of pulse trains is assured by using a joint counter. The system is used, for example, in computer mechanisms of well known linear interpolators.

Other systems of this type are used, for instance, in differential analyzers and others are utilized in difference analyzers.

The first-mentioned system, which is used with linear interpolators, is disadvantageous, especially when used in connection with a greater number of coordinate axes, due to the complicated nature of computer mechanisms designed for special purposes. Thus, for example, correction devices require bidirectional counters. Furthermore, the input circuit of the counter must be switchable in most cases concerning frequency capabilities. Another drawback is that it is rather difficult to establish the absolute number of pulses still to be produced up to the end of the programmed pulse train or to determine the maximum number of pulses of the programmed pulse series.

The other aforementioned systems require a much larger computer apparatus and are especially used with the parts of the computer which carry out further operations.

The principal object of the invention is to provide an improved system for generating a pulse train of a required number of pulses.

A further object of the invention is to provide such a system in which a series of pulse trains of different required numbers of pulses can be generated, all pulse trains being generated simultaneously with an even spacing. Another object of the invention is to provide reliable means for generating pulse trains for the digital control of machine tools, especially if the tool movement is to be controlled in two or three coordinate axes.

A further object of the invention is to accomplish the foregoing aims in a simple, practical and economical manner.

Still other objects of the invention will be apparent from the following description.

In accordance with the present invention, the foregoing objects are generally accomplished by providing the system with one or several shift registers into which the required numbers are introduced. The shift registers operate in connection with an accumulator or storage unit comprising a binary adder. The registers and binary adder are connected to evaluation means. Pulse trains of the required number of pulses are provided at the outputs of the evaluator.

The exact nature of the present invention as well as other advantages thereof will be readily apparent from a consideration of the following specification relating to the annexed drawings, in which:

FIG. 4 is a more detailed diagram of simplified circuits of an embodiment of the system of the present invention of binary operation;

FIG. 5 is a more detailed diagram of the logical circuitry of the binary adder of FIG. 4;

FIG. 6 is a table of the pulses as they occur at different times of the cycle in different parts of the circuitry of FIG. 4;

FIG. 7 illustrates the operation and movement of the machine tool of a digital control with the assistance of pulse trains provided by the circuits of FIGS. 4, 5 and 6;

Figure 1:
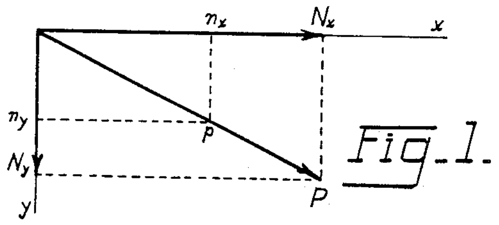
FIG. 1 shows schematically the operation and movement of a machine tool in a two coordinate system.

As already mentioned, the invention is especially adopted for use in digital machine tool control. In FIG. 1, the operation of linear interpolating means is schematically shown. The movements illustrated by the vector P of a machine tool in a two coordinate system $x$, $y$ are to be controlled. The component movement in the direction $x$ is indicated by a displacement N$x$ which represents A pulses. Similarly, the displacement N$y$ represents B pulses. In a three coordinate system, there is a third displacement representing a third number of pulses. The numbers of pulses A and B are indicated or provided by the program such as, for example, from the command unit of the digital machine tool control unit, to generate pulse trains corresponding to the numbers A and B. To obtain linear motion it is necessary that the pulses be evenly spaced from each other so that, for example, at each point $p$ the movements $nx$ and $ny$ are approximately proportional to the displacement N$x$ and N$y$.

Figure 2:
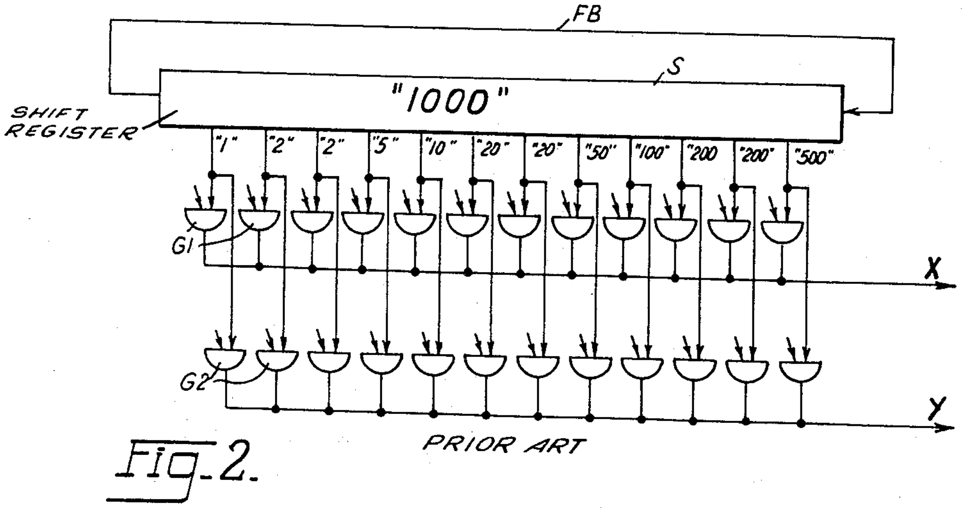
PRIOR ART Fig. 2.
FIG. 2 is a simple block diagram of a known system for generating two trains of pulses of selected numbers.

FIG. 2 illustrates a well known system in which preselected numbers A and B of magnitudes up to 1000 may be generated. This system comprises a counter having a cyclic shift register S with a feedback line FB. A thousand bits can circulate in the counter. Taps from the registers are provided in a manner whereby a pulse is fed to the first outlet 1 once in the given time of circulation or a cycle, a pulse is supplied to the second and third outlets "2" twice, a pulse is supplied to the fourth outlet "5" five-times . . . etc., the last outlet "500" being supplied with five hundred pulses at the same time. By opening or making conductive a certain pattern of a plurality of gates G1 and a plurality of gates G2 the required numbers A and B of pulses are supplied to the output lines X and Y. It is evident from FIG. 2 that the known system is complicated and utilizes not only a great number of gates G1 and G2, but also includes control means (not shown) for providing control pulses for such gates.

Figure 3:
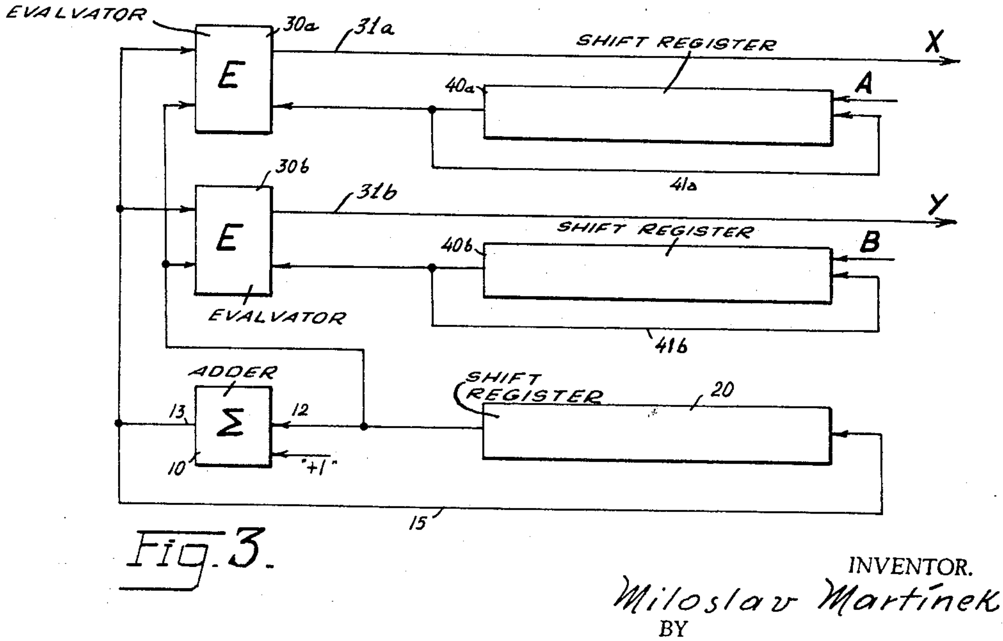
FIG. 3 is a block diagram of a simplified embodiment of the system of the present invention for generating two trains of pulses of two selected numbers.

The principal idea of the invention is first explained with relation to the embodiment of FIG. 3. In FIG. 3, a shift register 20 stores any type of numerical data or information whether binary or decimal. An adding circuit 10 may comprise a binary adder and in conjunction with a feedback line 15 functions as an accumulator or storage. The accumulator functions as a counter, since a predetermined amount is added in the adding circuit at each circulation or cycle. In FIG. 3, "+1" is added to the digit, so that the digit +1 is supplied to the adder. Thus, the circulating pulse train in the accumulator represents a number steadily increasing in magnitude by one up to its full capacity, then brought to zero to start increasing again. The increasing magnitude is produced in successive recurrent cycles.

The numbers A and B are introduced into shift registers 40*a* and 40*b*, respectively, and circulate via feedback lines 41*a* and 41*b*. The numbers are in the same system or code, binary or decimal as the numbers circulating in the accumulator 20, 15, 10 and represent the required number of pulses of which the pulse trains at the outlets X and Y are to consist.

Evaluating means consisting of evaluators or evaluating units 30*a* and 30*b* are connected to the registers 40*a* and 40*b*, respectively, and to the input 12 and output 13 of the binary adder 10. The evaluating units 30*a* and 30*b* are so arranged that a pulse X and a pulse Y are supplied in the outputs 31*a* and 31*b*, respectively at the instant that a change of order in the number passing through the adder 10 occurs and at the same instant the corresponding digit of the number A or B, respectively, is not zero. The meaning of the phase "change of order" is discussed in greater detail with regard to the embodiment of FIG. 4 and especially with regard to the table of FIG. 6.

For simplicity, it may be assumed, that the numbers of changes of order in passing through the binary counter during a cycle, may correspond to the capacity of the accumulator 10, 15, 20. In this way, if the accumulator is to maintain the number 1000 as a maximum, there will be 1000 changes of order in each working cycle and at the output of the respective evaluation unit there will be as many pulses provided as there are digits differing from zero. If, for example, the number A stored in the register 40*a* does not contain any zeros, 1000 pulses are supplied at the output X during the complete cycle, whereas if only zeros are present, no pulse is provided at the output X.

If the number A introduced into the register is changed, an obvious possibility arises for changing the required numbers of pulses of the outgoing pulse trains. Because the pulses in the outputs X and Y are derived from the same changes of order, it is thus ascertained that the pulses of the pulse trains will be evenly spaced from each other in the individual outputs.

FIG. 4 shows a simple embodiment of the system in which the principle of the invention is explained. For the sake of clarity, the capacities of the accumulator register 20 and of the registers 40*a* and 40*b* are restricted to the number "eight." There may thus be "zero" to "seven"

pulses in the pulse trains at the outputs $x$ and $y$ in each cycle. The numbers A and B are provided in the binary system, so that $$A=z.2^{0}+y.2^{1}+x.2^{2} \quad \text{(A)}$$

$$B=v.2^{0}+u.2^{1}+t.2^{2} \quad \text{(B)}$$

as shown by the registers 40*a* and 40*b* of FIG. 4. Similarly, a number N stored in the accumulator register 20 is defined in binary terms as $$N=a.2^{0}+b.2^{1}+c.2^{2} \quad \text{(N)}$$

The number N circulates in the circuit 20, 15, 10 continuously and increases to its maximum of seven in the present example, and decreases to zero.

The adder or adding unit 10 comprises of a half-adder 100 with a carry circuit having a delay element 101. A logical diagram of a half-adder is shown in FIG. 5. The half-adder circuit 100 of FIG. 5 comprises an OR gate 102, two AND gates 103 and 104 and an inverter 105 interconnected in a manner whereby the first output $d$ is a logic function called "Exclusive OR," and the second output $e$ is the logical multiplication or conjunction. In Boolean algebra the condition of the first and second outputs of the half-adder 100 are defined by the relations $$d=a.\bar{g}+\bar{a}.g \quad (1)$$

$$e=a.g \quad (2)$$

where $a$ and $g$ are the conditions of the first and second inputs and $\bar{a}$ and $\bar{g}$ are their complements.

The delay element 101 delays the pulses in the carry circuit by one period, that is, the Boolean quantity at the output of said delay element is defined by a logical function $f$, where $$f_{n}=e_{n-1} \quad (3)$$

which means that the condition of the output of the delay element 101 is equal to the condition of the input one period earlier.

An or gate 106 is connected between the delay element 101 and the feedback input $g$ into the half-adder 100. Pulses $h$ are periodically supplied to the second input of the OR gate 106. In the present example, the pulse $h$ is supplied every third period. The condition of the second input $g$ to the half-adder 100 is therefore defined in Boolean functions by the logical addition or disjunction $$g=f+h \quad (4)$$

The evaluator or evaluation unit 300 comprises an inverter 301 in which the function "$a$" at the first input of the half-adder 100 is changed into $a$ which is supplied to an AND gate 302. The output "$d$" of the binary half-adder 100 is supplied to the AND gate 302, a Boolean function defined by the following equation is provided at the output E $$E=\bar{a}.d \quad (5)$$

The output E of the AND gate 302 is fed to the first inputs of two AND gates 303 and 304. The second inputs $x$ and $y$ of the AND gates 303 and 304 are the outputs of the shift registers 40*a* and 40*b*, respectively, so that the functions at the outputs Y and X of the AND gates 303 and 304 in Boolean terms are $$Y=E.+ \quad (6)$$

$$X=E.X \quad (7)$$

The system of FIG. 4 in comparison with that of FIG. 3 avoids the duplication of the AND gates 301 and 302, said AND gates being included in each of the two evaluation units 30*a* and 30*b* of the embodiment of FIG. 3.

The table of FIG. 6 aids in explaining the operation of the system of FIG. 4. The table of FIG. 6 lists cyclic changes in one cycle containing 24 periods denoted by $t_0$, $t_1$ . . . $t_{22}$, $t_{23}$. The vertical columns list Boolean values at different parts of the system denoted by the appropriate lettering. The Boolean value at the second input $h$ of the OR gate 106 is defined in this example by the following relationship $$h_n=1 \text{ /for } n=0, 3, 6, 9 \ldots 21 \quad (8)$$
$$h_n=0 \text{ /for } n=1, 2, 4, 5, 7, 8, 10, 11 \ldots 22, 23 \quad (8a)$$

and due to the cyclic circulation in the registers the following relations hold true $$a_n=b_n+1;\ b_n=c_n+1;\ c_n=d_n+1 \quad (9)$$

and $$x_n=y_n+1;\ y_n=z_n+1;\ z_n=x_n+1 \quad (10)$$
$$t_n=u_n+1;\ u_n=v_n+1;\ v_n=t_n+1 \quad (11)$$

The table of FIG. 6 illustrates that the number stored in the accumulator increases by one every third period. In each third period, $t_0$, $t_3$, $t_6$ . . . , the number N is defined by the relation $$N=a.2^{\circ}+b.2^1+c.2^2 \quad (N)$$

| | | |
|---|---|---|
| $N_0=0$ | in binary notation | $N_0=000$ |
| $N_3=1$ | | $N_3=001$ |
| $N_6=2$ | | $N_6=010$ |
| $N_9=3$ | | $N_9=011$ |
| $N_{12}=4$ | | $N_{12}=100$ |
| $N_{15}=5$ | | $N_{15}=101$ |
| $N_{18}=6$ | | $N_{18}=110$ |
| $N_{21}=7$ | | $N_{21}=111$ |

Using the relations (1), (2), (3), (4) and (5) the function E in the table of FIG. 6 is calculated for each period $t_n$. The Boolean function E has the value 1 whenever there is change of order or change in placement of the number N,—in binary code, when it passes through the half-adder, 100, that is, whenever a binary digit $a$ at the input of the adder is "0" and changes to a binary digit "$d$" of the value "1" at the output of the adder.

It can be seen from the table that the value "1" of function E occurs seven times in the cycle:

| | | | |
|---|---|---|---|
| once | in the order | $2^0$ | $E_{11}=1$ |
| twice | in the order | $2^1$ | $E_4=E_{16}=1$ |
| four times | in the order | $2^2$ | $E_0=E_6=E_{12}=E_{18}=1$ |

By combination of these functions, any required number of pulses from "0" to "7" may be provided. This is assured by comparing the function E with the numbers A and B, which are in binary code and in same timed sequence.

Practically logical products of the relations (6) and (7) are provided by function E and the actual binary digit of the number leaving the register 40$a$ or 40$b$, respectively. This is achieved by the AND gates 303 and 304. In the example of FIG. 6, the numbers A and B were selected as:

| | | |
|---|---|---|
| $A=2$ | in binary notation | $A=010$ |
| $B=6$ | | $B=110$ |

The number A in binary notation comprises only one digit differing from zero, i.e. the middle digit which corresponds to changed orders in the 4th and 16th periods. Therefore, two pulses are provided at the output X of the evaluation unit 300. The number B has the highest and middle digits differing from zero. The highest digit corresponds to changed orders in the 0th, 4th, 6th, 12th, 16th and 18th periods. Due to the combination, the pulse at the output Y is provided in the periods $t_0$, $t_4$, $t_6$, $t_{12}$, $t_{16}$, and $t_{18}$. That is six times during the cycle.

Generally speaking, it can be readily seen that of the numbers A and B; if the lowest order digit Z and V, respectively, is "1" . . . a pulse is provided in the period $t_{11}$ only, if the middle order digit Y and U, respectively, is "1" . . . provided in the periods to $t_6$, $t_{12}$ and $t_{18}$; and if the highest order digit X and $t$, respectively, is "1" . . . a pulse is provided in the periods $t_4$ and $t_{16}$.

For different combinations of digits, that is, for different numbers A and B in binary code, the required numbers of pulses are thus provided and the actual number A and B, respectively, selects the necessary pulses by itself. From the table in FIG. 6, it may be seen that the pulses X are evenly spaced with regard to the pulses Y.

The resultant movement of a machinetool is shown in FIG. 7 when the pulses X and Y are used for control in a digital control system. The movement or displacement of the tool from the point O to the point P is accomplished in six steps, in the periods to $t_4$, $t_6$, $t_{12}$, $t_{16}$ and $t_{18}$, in the direction $x$ and in two steps, in the periods $t_4$ and $t_{16}$, in the direction $y$. The broken line OP indicates the path of the actual movement of the tool, which path is very close to the theoretically required path along the straight line OP.

Usually only one set of pulse trains is required. That is, after the cycle of pulses corresponding to the numbers A and B, a cycle corresponding to different numbers is required. For this reason, the working cycle must terminate, as shown in the table of FIG. 6, after the period $t_{23}$. This is achieved by a determining circuit 46 connected into the feedback line 15, which circuit functions to interrupt the circulation in the accumulator when the required number of pulses have already been provided. The circuit 46 may comprise a counter which counts a certain number of periods, such as 24 periods in this example, and interrupts the line 15 upon completion of the cycle.

The determining circuit may also be used to accelerate the provision of pulses. Thus, for example, in case three pulses Y are required in the embodiment of FIG. 4, the number $B=6$ could still be supplied to the register 40$b$, but the determining circuit would have to terminate upon completion of half the cycle, that is, after the period $t_{11}$.

The determining circuit 46 of FIG. 4, terminates the cycle under the control of the "overflow" of the accumulator 10, 15, 20. Such overflow actually occurs only once in the cycle, when there is a carry of the highest order. Thus, in FIG. 4, an AND gate 461 receives pulses $f$ and $h$ from the inputs to the OR gate 106. The output of the AND gate 461 is connected to the input of an inverter 462. An AND gate 463 is connected in the line 15 so that when "zero" appears in the output of the inverter 462, the line 15 is interrupted.

Although, for the sake of clarity, only numbers of clarity, only numbers of 8 digits were used for explaining the principles of operation of FIGS. 4, 5 and 6, in a practical embodiment there would be many more digits, and devices of this type have been designed for producing as many as 1000 pulses. In such a case the oroken line OP very nearly approximates the actual path of the tool.

Figures 8, 9:
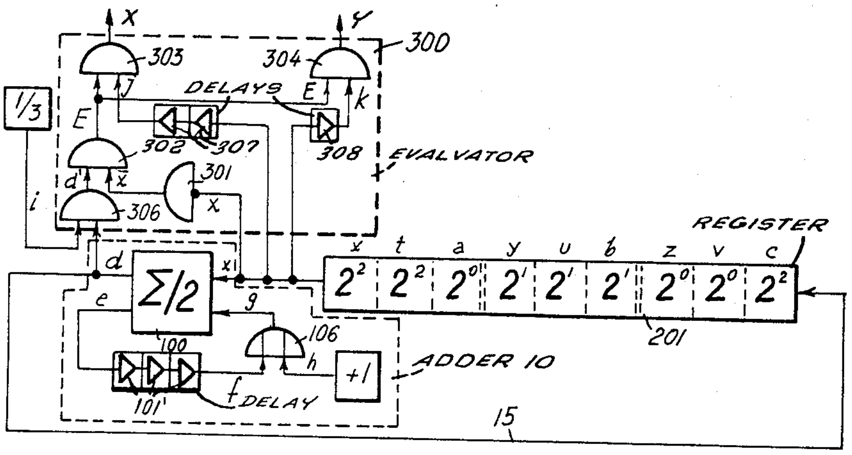
FIG. 8 is a block diagram of another embodiment of the system of the present invention.
FIG. 9 is a table of the sequence of pulses in the system of FIG. 7.

FIG. 8 is another embodiment of the system of the present invention. The corresponding components of FIGS. 4, and 8 are correspondingly identified. In FIG. 8, the registers 20, 40$a$ and 40$b$ of FIG. 4 are combined in a single prolonged register 201 which functions as the accumulator with an adder or adding unit 10 and the feedback line 15. The numbers N, A and B circulate intermixedly in the accumulator, as indicated by comparing FIGS. 4 and 8. Since the information concerning each number occurs about only every third period, the cycle consists of three times the number of periods of FIGS. 4, 5 and 6 and the operation will last three times longer.

In the table of FIG. 9, the sequence of Boolean functions is listed for the periods $T_0$, $T_1$, $T_2$, $T_4$ . . . etc. Three periods such as, for example, $T_0$, $T_1$, $T_2$, correspond to one period such as, for example, $t_0$, of the table of FIG. 6.

The Boolean functions in the example of the embodiment in FIG. 8 are $$d=x\cdot g+x\cdot g \quad (1')$$
$$e=x\cdot g \quad (2')$$
$$f_n=e_n-3 \quad (3')$$
$$g=f+h \quad (4')$$

The only difference in structure of the adding circuit 10 of FIGS. 4 and 8 is that in the carry circuit there are three delay elements 101' instead of the single delay element 101 of FIG. 4. A comparison of Equations 3 and 3' indicates that the pulse $e$ is delayed by three periods.

In the embodiments of FIG. 4 and FIG. 8, the evaluation unit comprises an inverter 301 of which the input $x$ to the adder is changed to $\bar{x}$, AND gates 302, 303 and 304. To assure that pulses are generated only in each third period, an AND gate 306 is connected to the first input, the function $d$ lead. The second input is connected to a function $i$ lead which provides the value "1" every third period. The output of the AND gate 306 is connected to an input of the AND gate 302, to the other input of which is connected the output of the inverter 301. The AND gate 306 operates only to inhibit the functions, except every third period, and may be connected differently in any other part of the circuit.

The first inputs of the AND gates 303 and 304 are connected to the output E of the AND gate 302. The second inputs $j$ and $k$ are supplied from the output $x$ of the register 201 via two delay elements 307 and one delay element 308, respectively. The following relationships exist:

$$E=\bar{x}\cdot d' \quad (5')$$

where $$d'=i\cdot d$$

and $$i_n=1 \text{ for } n=2,5,8,11 \ldots$$
$$i_n=0 \textit{ for } n=0,1;3,4;6,7; \ldots$$

further $$k_n=x_{n-1} \quad (5')$$
$$j_n=x_{n-2} \quad (5b')$$

and finally $$X=E\cdot j \quad (6')$$
$$Y=E\cdot k \quad (7')$$

The operation of the system is illustrated by the table of FIG. 9, in which the functions up to the 29th period $T_{29}$, which corresponds to the 9th period $t_9$ of the table of FIG. 6, are depicted. For the sake of clarity, the same magnitude of the numbers A and B, $A=2$ and $B=6$ are shown in FIG. 9.

Figure 10:
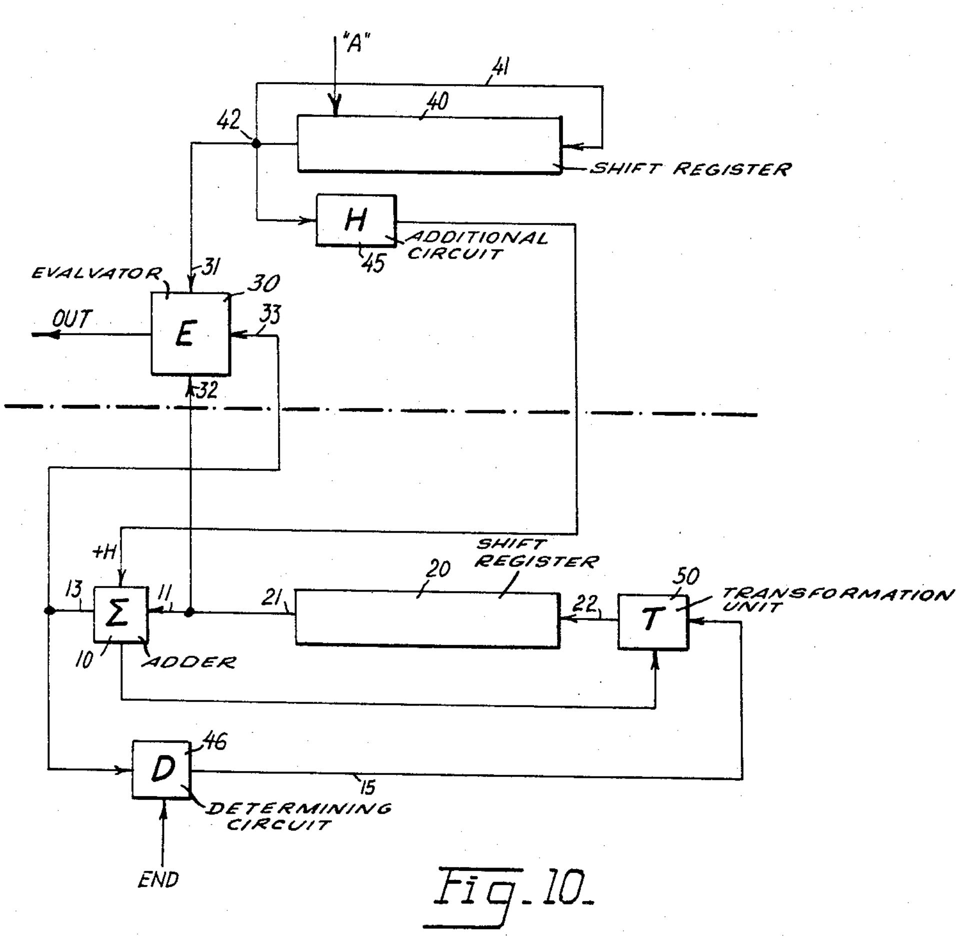
FIG. 10 is a block diagram of a more complex embodiment of the system of the present invention for generating pulses of a selected number, operating in binary code in a decode system.

The system of FIG. 10 provides that the binary pattern of the number A in a decimal or decade system corresponds to the required number of pulses and is supplied to a cyclically shiftable register 40 with a feedback line 41. The output 42 of the shift register 40 provides a pulse train which may be regarded as a word consisting of decimal digits of the required number of pulses, each digit comprising bits (of binary code) in series. The pulse train is supplied to the first input 31 of an evaluator or evaluation unit 30. Pulses are supplied to a second input 32 of the evaluation unit 30 and correspond to the pulses supplied via the input 11 of the binary adder 10. The output 13 of the adder 10 is connected to a third input 33 of the evaluation unit 30.

The pulses in the output 21 of a shift register 20 are supplied to the input 11 of the binary adder 10 and the pulses in the output 13 of said adder are supplied to the input 22 of said register and to the input 33 of the evaluator 30. The binary adder 10 periodically charges the pattern of the number circulating in the accumulator unit to a new pattern which differs from the first number by a specific pattern representing in the binary code a number +H having a value of for example, "one." The accumulator unit comprises the binary adder 10, the shift register 20 and the feedback channel 15. The evaluation unit 30 follows the change in position of the number passing through the binary adder 10 in the manner hereinbefore explained with regards to FIGS. 4 and 6.

The evaluation unit 30 provides a logical product of the functions represented by pulses at all three inputs 31, 32 and 33 and provides the result at the output OUT. This result thus depends upon the individual positions of the number pattern from the shift register 40.

A determining circuit 46 is connected to the accumulator 10, 15, 20, which, depending upon the condition and status of the shift register 20, terminates the work cycle.

The determining circuit 46 may be provided by different circuits. Thus, for example, it may comprise a counter for counting the bits of the word circulating in the accumulator group, or the determining circuit may be connected to a control or command unit which supplies an "END" pulse to said determining circuit. The determining circuit 46 may be similar to that of FIG. 4.

The accumulator 10, 15, 20 of FIG. 10 includes a transformation unit 50. This transformation unit 50 must be utilized when decimal or decade systems of data circulate in the accumulator having a binary adder. The binary code number "+6" is utilized to explain the operation of the transformation unit, because the carry from the increased number "9" represented as "1111" may be used as a "1" added to the binary number representing the digit of the higher order. The transformation is due to the fact that to each binary number which has effected a carry, the binary number "6" or 0110 is added. Thus, for example, the zero in the binary system 0000 is transformed into zero in the binary code "plus six." The transformation unit 50 receives pulses from the carry circuit of the adder 10.

A plurality of shift registers 40 and the corresponding evaluation units 30 of FIG. 10, as shown above the broken line of FIG. 10, may be connected to the accumulator 10, 15, 20. Thus, several groups of pulses of varying contents are received from the outputs of the evaluation units 30 in corresponding time intervals, with even spacing, and the uniformity of mutual distribution is assured. In a machinetool control system for one machining operation there may be three axes, whereas control systems for processing an entire plant may require as many as a hundred different pulse trains to be provided at even spacing in order to control the process at many different points of the plant.

An additional circuit 45 is shown in FIG. 10 connected to the shift register 40. The additional circuit 45 determines the change factor of the number supplied to the shift register 20. The additional circuit 45 is used as an alternative for supplying the change factor or number +H to the adder 10 at the required instants of time such as, for example, once for each number circulated in the shift regsiter 40. The advantage of the additional circuit 45 may be realized when the number A stored in the shift register 40 has less digits than the capacity of said register. In such a case, the circuit 45 may be energized by the first digit different from zero. When energized, the circuit 45 supplies the pulse +H and accelerates the operation substantially. The additional circuit 45 may comprise a simple flip-flop circuit released by pulses at the output 42 of the shift register 40.

If a plurality of registers 40 are used and each is provided with an additional circuit 45, provision must be made that the change factor be provided by the circuit 45 and be the first in time and that all others be released afterward.

A computer operating in the aforedescribed manner comprises the main shift register or storage unit 20, the adder 10 including the half adders 100, and additional shift registers or storage units 40 to which the pulse distribution of the numbers corresponding are supplied to the required number of output pulses. In the programmed change of the number pattern in the main adder after the supply of the input pulses, the evaluation unit 30 evaluates the change from the original pulse distribution and provides the output pulses in accordance with the pertinent pattern of the various pulse series required.

Consequently, if a transformation unit 50 is utilized, it is very simple to operate with a decimal or decade code using a binary adder in the counter of the main unit if the data supplied to the shift registers is suitably processed.

A considerable advantage is that the highest number stored in the register 20 is readily determined by the evaluation unit 30. It is thus possible to supply the input pulse to the binary adder at the exact instant that the first order of the highest number is in the register 20. There is an alternate possibility of carrying out this operation at the instant that the second order of the highest number is in the register 20. A pulse is then provided automatically by the evaluation circuit at the output OUT in the first order place. In this manner, the overall operation is essentially accelerated.

The evaluation circuit enables the approximate determination, with great facility, of the absolute number value of the pulses of any train, still to be produced. That is, the evaluation circuit compares the status or condition of the main shift register with the shift register in which the number values of the produced pulses are determined.

The system of my invention and its operation and advantages will be understood from the foregoing detailed description. Some of the features of the system of my invention are reviewed hereinafter.

My invention is a system for providing pulses of a required number which are evenly or equidistantly spaced from each other. The present improvement comprises a cyclically shiftable register to which pulses representing a number are supplied. The pattern of the number A, which corresponds to the required number of pulses, is supplied to the cyclically shiftable register 40. The output of the register 40 describes the train pattern of the required number of pulses and is connected to one of the inputs of the evaluation unit 30. Pulses are supplied to the second input of the evaluation unit 30 which agree with pulses supplied to the binary adder 10 and the outputs of the adder 10 are supplied to the third input of the unit 30.

The output pulses of the second shift register 20 are supplied to the adder 10 and the output pulses of said adder are supplied to the register 20. The adder 10 changes the pattern of a number circulating in an accumulator unit to a new pattern which differs from the first number, for example, by one. The accumulator unit comprises the binary adder 10 and the shift register 20. During these occurrences the evaluation unit 30 responds to each change of order of the number which passes through the binary adder 10. The occurrence of these changes in the evaluation unit 30 is combined with pulses from the shift register 40 and is supplied to the output OUT. The accumulator 10, 15, 20 may include a determining circuit which, in accordance with the condition and status of the shift register 20, terminates the work cycle.

The system of the invention may also provide a transformation unit 50 in the accumulator 10, 15, 20. The transformation 50 is controlled by carry pulses from the binary adder 10 to enable the supply of decimals or decade input data to the shift register 40.

In accordance with the invention, a plurality of the shift registers 40 may be connected to the accumulator 10, 15, 20 and the corresponding evaluation units 30 whereby the evaluation unit provides a plurality of groups of pulses differing from each other in content and equally spaced from each other.

It will be apparent that while I have described my invention in a few embodiments only, many changes and modifications may be made without departing from the spirit of the invention defined in the following claims.

I claim:

1. In a system for providing pulse trains of preselected numbers of pulses equally spaced from each other, an accumulator circuit comprising
- a shift register for storing a number of pulses in a pattern of a determined code,
- a feedback line connecting the output of said shift register to the input of said shift register for completing the circulation of said number of pulses,
- adding means connected in said feedback line for changing the pattern of the number of pulses circirculated therein and in said shift register to a new pattern which differs from that of the first-named number by a predetermined amount,
- a plurality of additional shift registers having feedback lines into which numbers are supplied representing the selected number of pulses to be provided; and
- evaluation means having a plurality of outputs at which the selected pulse trains are provided at equal spacing from each other, each of said outputs corresponding to one of said additional shift registers, and a plurality of inputs,
  - one of said inputs having supplied thereto pulses representing pulses supplied to said adding means, a second of said inputs having supplied thereto pulses representing pulses supplied by said adding means to said first-mentioned shift register, and others of said inputs being connected to the outputs of said additional shift registers,
- said evaluation means providing a pulse in the selected pulse train when there is concurrently
  - a change of order in the number passing through said adding means,
  - and a pulse representing a digit differing from zero at the output of a corresponding one of said plurality of additional shift registers.

2. The system as claimed in claim 1, wherein the evaluation means comprises
- first means for providing a logical product of the negative function representing the pulses of the number suplied to said adding means and the function representing the pulses at the output of said adding means; and
- second means for providing a logical product of the output of said first means and the output of a corresponding one of said plurality of additional shift registers.

3. The system as claimed in claim 1, wherein the adding means of said accumulator circuit comprises
- a half-adder having a carry circuit, delay means connected in said carry circuit and means for supplying to said carry circuit pulses representative of the predetermined amount by which the new pattern of the number differs from the pattern of the number after passing through said adding means.

4. The system as claimed in claim 3, further comprising determining means connected in the feedback line of said accumulator circuit for terminating a work cycle.

5. The system as claimed in claim 4, wherein said determining means comprises means for interrupting the circulation in said accumulator circuit, said means being connected to the carry circuit of said adding means via means for providing the logical product of the function representative of the carry pulses in said adding means and of the function representative of the pulses by which the predetermined amount for changing the pattern is provided.

6. In a system for providing pulse trains of preselected numbers of pulses equally spaced from each other, an accumulator circuit comprising
- a shift register for storing a number of pulses in patterns representing intermixedly a plurality of numbers in a determined code, a feedback line connecting the output of said shift register to the input of said shift register for completing the circulation of said numbers of pulses, adding means connected in said feedback line for changing the pattern of at least one of the number of pulses circulated therein and in said shift register to a new pattern which differs from that of said first-named number by a predetermined amount; and evaluation means having a plurality of outputs for providing the selected pulse trains at equal spacing from each other and at least two inputs, one of said inputs having supplied thereto pulses representing pulses supplied to said adding means and a second of said inputs having supplied thereto pulses representing pulses supplied by said adding means, said evaluation means providing a pulse in the selected pulse train when there is concurrently a change of order in the number passing through said adding means, the pattern of which number differs from the supplied number by a predetermined amount and a pulse representing a digit differing from zero in the respective one of the other numbers stored in said accumulator circuit and supplied to said adding means at a time period adjacent to the time period of the changed order.

7. The system as claimed in claim 6, wherein said evaluation means comprises first means for providing a logical product of the negative function representing the pulses of the number supplied to said adding means and the function representing the pulses at the output of said adding means; and second means for providing a logical product of the output of said first means the output of the shift register representing the respective other number stored in said accumulator circuit and supplied to said adding means in an adjacent time period.

8. The system as claimed in claim 6, wherein the adding means of said accumulator circuit comprises a half-adder having a carry circuit, delay means connected in said carry circuit and means for supplying to said carry circuit pulses representative of the predetermined amount by which the new pattern of the first number circulating in the accumulator circuit is to be changed.

9. The system as claimed in claim 6, further comprising determining means connected in the feedback line of said accumulator circuit for terminating a work cycle in accordance with the condition of said accumulator circuit.

10. In a system for providing pulses of a selected number, a cyclically shiftable register to which pulses representing the selected number are supplied, said shiftable register having an output representing the pulse train pattern of the selected number;

an adding circuit;

evaluation means having a plurality of inputs, one of said inputs being connected to the output of said shiftable register, a second of said inputs having supplied thereto pulses representing pulses supplied to said adding circuit and a third of said inputs having supplied thereto pulses from the output of said adding circuit;

a second shift register having an output connected to the input of said adding circuit and means connecting the output pulses from said adding circuit back to the input of said second register;

said adding circuit changing the pattern of a number circulating therein and in said second register to a new pattern which differs from that of the first-named number by a predetermined amount;

said adding circuit and said second register forming an accumulator;

said evaluation means responding to each change of order of the number passing through said adding circuit and combining the occurrence of the changes of order with pulses at the output of said cyclically shiftable register so that output pulses are provided at the output of said evaluation means in accordance with the various orders of the number; and a determining circuit included in said accumulator for terminating a work cycle in accordance with the condition and status of said accumulator.

11. The system as claimed in claim 10, wherein said accumulator includes a transformation unit controlled by the carry pulses from said adding circuit for feeding decimal input data to said cyclically shiftable register at predetermined specific times.

12. The system as claimed in claim 10, further comprising a plurality of cyclically shiftable registers each connected to said accumulator and a plurality of evaluation units each connected to a corresponding one of said cyclically shiftable registers to provide a plurality of data handling groups for handling data differing from each other by their contents and for providing for equal spacing between data pulses from the outputs of said evaluation units.

13. The system as claimed in claim 10, further comprising an additional circuit connected between said cyclically shiftable register and said adding circuit for supplying to said adding circuit the change factor of the predetermined amount for changing the pattern of the number circulating in said accumulator.

14. The system as claimed in claim 13, further comprising gate means connected to the input of said additional circuit and controlled by the output of said cyclically shiftable register in a manner whereby said gate means is switched to its non-conductive condition when digits representing zero are in said output and is switched to its conductive condition when the first digit different from zero is in said output.

15. The system as claimed in claim 13, further comprising gate means connected to the input of said additional circuit and controlled by the output of said cyclically shiftable register in a manner whereby said gate means is switched to its non-conductive condition when digits representing zero are in said output and when the first digit different from zero is in said output and is switched to its conductive condition when the next following order after said first digit different from zero is in said output, and other gate means connected to the output of said cyclically shiftable register and switched to its conductive condition when said first digit different from zero is in said output to permit said evaluation means to provide the selected pulses.

16. The system as claimed in claim 10, wherein said evaluation means compares the condition of the first-mentioned register with that of the second register from which the number values are determined, in order to determine the absolute number value of pulses still to be produced.

17. The system as claimed in claim 12, further comprising a plurality of additional circuits each connected to the output of a corresponding one of said cyclically shiftable registers and each having an output connected to said adding circuit, said additional circuits changing the pattern of the number by a determined amount, the outputs of said additional circuits being interconnected via gate means for disconnecting all of said additional circuits except that first energized.

18. The system as claimed in claim 17, further comprising gate means connected to the input of each of said additional circuits and controlled by the output of the corresponding one of said cyclically shiftable registers in a manner whereby said gate means is switched to its non-conductive condition when digits representing zero are in said output and is switched to its conductive condition when the first digit different from zero is in said output.

19. The system as claimed in claim 17, further comprising gate means connected to the input of each of said additional circuits and controlled by the output of the corresponding ones of said cyclically shiftable registers in a manner whereby said gate means is switched to its non-conductive condition when digits representing zero are in said output and when the first digit different from zero is in said output and is switched to its conductive condition when the next following order after said first digit different from zero is in said output, and other gate means connected to the output of each of said cyclically shiftable registers and switched to its conductive condition when said first digit different from zero is in said output to permit the corresponding one of said evaluation means to provide the selected pulse.

No references cited.

ARTHUR GAUSS, *Primary Examiner.*

STANLEY D. MILLER, Jr., *Assistant Examiner.*